United States Patent
Kaneko

(10) Patent No.: US 8,307,644 B2
(45) Date of Patent: Nov. 13, 2012

(54) CONTROL DEVICE AND CONTROL METHOD FOR INTERNAL COMBUSTION ENGINE

(75) Inventor: Naoya Kaneko, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 492 days.

(21) Appl. No.: 12/669,681

(22) PCT Filed: Jul. 17, 2008

(86) PCT No.: PCT/IB2008/001865
§ 371 (c)(1), (2), (4) Date: Jan. 19, 2010

(87) PCT Pub. No.: WO2009/010862
PCT Pub. Date: Jan. 22, 2009

(65) Prior Publication Data
US 2010/0192882 A1    Aug. 5, 2010

(30) Foreign Application Priority Data
Jul. 18, 2007 (JP) ................. 2007-187401

(51) Int. Cl.
*F02D 23/00* (2006.01)
(52) U.S. Cl. ............... 60/600; 60/602; 60/608; 123/432
(58) Field of Classification Search ................ 60/600, 60/602, 68; 123/301, 302, 432
See application file for complete search history.

(56) References Cited

U.S. PATENT DOCUMENTS

| 8,000,878 B2* | 8/2011 | Massard et al. ............... 701/103 |
| 2008/0216474 A1 | 9/2008 | Turner |

FOREIGN PATENT DOCUMENTS

| FR | 2 835 882 | 8/2003 |
| JP | 61 164039 | 7/1986 |
| JP | 10 089106 | 4/1998 |
| JP | 2000 73790 | 3/2000 |
| WO | 2005 068802 | 7/2005 |

* cited by examiner

*Primary Examiner* — Ching Chang
(74) *Attorney, Agent, or Firm* — Oblon, Spivak, McClelland, Maier & Neustadt, L.L.P.

(57) ABSTRACT

A cylinder of an internal combustion engine is provided with a turbo-side exhaust valve that opens and closes an exhaust port that communicates with a turbo-side exhaust passageway that leads to a turbine inlet opening of a turbo-supercharger, a bypass-side exhaust valve that opens and closes an exhaust port that communicates with a bypass-side exhaust passageway that bypasses the turbine, a first intake valve disposed opposite to the turbo-side exhaust valve, and a second intake valve disposed opposite to the bypass-side exhaust valve. At the time of engine startup and/or the time of low engine load, the turbo-side exhaust valve and the first intake valve are stopped in the closed state.

11 Claims, 3 Drawing Sheets

TIME OF ENGINE STARTUP, LOW LOAD

TIME OF INTERMEDIATE, HIGH LOAD

CONTROL DEVICE AND CONTROL METHOD FOR INTERNAL COMBUSTION ENGINE

INCORPORATION BY REFERENCE

The disclosure of Japanese Patent Application No. 2007-187401 filed on Jul. 18, 2007 including the specification, drawings and abstract is incorporated herein by reference in its entirety.

BACKGROUND OF THE INVENTION

1. Field of the Invention

The invention relates to a control device and a control method for an internal combustion engine.

2. Description of the Related Art

Generally, a turbosupercharger-equipped engine has a problem of the back pressure becoming high in a high-speed and high-load operation region and therefore making it difficult to discharge the burned gas from the cylinders, so that the amount of gas remaining in the cylinders tends to be large. If the amount of residual gas in the cylinders becomes large, the combustion rate becomes slow and the in-cylinder temperature becomes high, so that knocking is likely to occur. Then, in order to avoid the knocking, it becomes necessary to perform an ignition timing retardation, which results in degraded fuel economy and reduced engine output. Besides, increases in the amount of residual gas correspondingly reduce the amount of air. Due to these circumstances, it is not easy to increase the output of the turbosupercharger-equipped engine in a high-rotation speed operation region.

In order to solve the problem as stated above, Japanese Patent Application Publication No. 10-89106 (JP-A-10-89106), for example, discloses an engine in which each cylinder is provided with a turbo-side exhaust valve that opens and closes an exhaust port that communicates with a turbo-side exhaust passageway that leads to a turbine inlet opening of the turbosupercharger, and with a bypass-side exhaust valve that opens and closes an exhaust port that communicates with a bypass-side exhaust passageway that does not lead to the turbine inlet opening.

Besides the problem of the difficulty in achieving high engine output in a high-speed operation region, the turbo-supercharger-equipped engines also have a problem of the catalyst warm-up at the time of startup of the engine requiring a long time. Furthermore, depending on the engine operation region, there is a problem of knocking or misfire being likely to occur, a problem of the required voltage of the ignition plug tending to become high due to heightened in-cylinder temperature, or the like.

SUMMARY OF THE INVENTION

The invention provides a control device and a control method for an internal combustion engine which are capable of bettering various characteristics of a turbo-supercharger-equipped internal combustion engine.

A first aspect of the invention is a control device for an internal combustion engine internal combustion engine control device including: an internal combustion engine in which a first cylinder is provided with a turbo-side exhaust valve that opens and closes an exhaust port that communicates with a turbo-side exhaust passageway that leads to a turbine inlet opening of a turbo-supercharger, a bypass-side exhaust valve that opens and closes an exhaust port that communicates with a bypass-side exhaust passageway that bypasses the turbine, a first intake valve disposed opposite to the turbo-side exhaust valve, and a second intake valve disposed opposite to the bypass-side exhaust valve; a turbo-side exhaust valve stop mechanism that stops the turbo-side exhaust valve in a closed state while allowing the bypass-side exhaust valve to be in operation; a first intake valve stop mechanism that stops the first intake valve in the closed state while allowing the second intake valve to be in operation; and a stop mechanism control portion that stops the turbo-side exhaust valve and the first intake valve in the closed state at a time of startup of the internal combustion engine and/or a time of low load of the internal combustion engine.

According to the foregoing aspect of the invention, at the time of engine startup and/or the time of low engine load, the turbo-side exhaust valve and the first intake valve disposed opposite to the turbo-side exhaust valve in the first cylinder can be stopped in the closed state. Therefore, when the burned gas in the first cylinder is replaced by fresh air, the in-cylinder gas flows from the second intake valve toward the bypass-side exhaust valve, so that a strong swirl rotating in that direction can be produced. As a result, the mixing in the cylinder is promoted, and the combustion can be bettered. Therefore, good combustion can be performed even in a severe combustion condition, such as low temperature, low engine speed, a lean-burn operation, an EGR operation, etc. Therefore, excellent effect of fuel economy betterment and excellent effect of knocking prevention can be attained.

In the first aspect, at a time of intermediate load of the internal combustion engine and/or a time of high load of the internal combustion engine, an open valve duration of the turbo-side exhaust valve may be made longer than an open valve duration of the bypass-side exhaust valve, and an open valve duration of the first intake valve may be made longer than an open valve duration of the second intake valve.

Therefore, as for the flow of the burned gas discharged from the first cylinder, the turbo-side exhaust valve-side flow becomes the main flow. As for the flow of fresh air entering the first cylinder, the first intake valve-side flow becomes the main flow. Hence, as for the gas flow in the first cylinder, the flow from the first intake valve toward the turbo-side exhaust valve becomes the main flow, so that a strong swirl rotating in the direction of the main flow can be produced. As a result, the mixing in the first cylinder is promoted, and the combustion can be bettered. Therefore, good combustion can be performed even in a severe combustion condition, such as low temperature, low engine speed, a lean-burn operation, an EGR operation, etc.

In the foregoing constructions, a rotation direction of a swirl formed in the first cylinder at the time of startup of the internal combustion engine and/or the time of low load of the internal combustion engine may be opposite to a rotation direction of a swirl formed in the first cylinder at the time of intermediate load of the internal combustion engine and/or the time of high load of the internal combustion engine.

Therefore, a swirl can be produced in a direction in which the swirl can more easily rotate, according to the operation states of the intake valves and the exhaust valves, and therefore the swirl can be made sufficiently strong.

Furthermore, in the foregoing constructions, at the time of intermediate load of the internal combustion engine and/or the time of high load of the internal combustion engine, the bypass-side exhaust valve may be opened later than the turbo-side exhaust valve, and the bypass-side exhaust valve may be closed later than the turbo-side exhaust valve.

Therefore, in a high-speed and high-load operation region, the burned gas in the first cylinder can be discharged into the bypass-side exhaust passageway at higher efficiency, so that the amount of residual gas in the first cylinder can be sufficiently reduced. Therefore, increased output of the internal combustion engine can be achieved.

Furthermore, in the foregoing constructions, the internal combustion engine may have two ignition plugs for the first cylinder, and one ignition plug of the two ignition plugs may be disposed near a center of the first cylinder, another ignition plug of the two ignition plugs may be disposed at a position that is nearer to the bypass-side exhaust valve than to the turbo-side exhaust valve.

Therefore, in the case where two ignition plugs are disposed in the first cylinder, one of the two ignition plugs can be disposed in the vicinity of the bypass-side exhaust valve, in which temperature is relatively low. Hence, the service life of the ignition plugs can be extended. Besides, instead of expensive ignition plugs that withstand high voltage, inexpensive low-voltage ignition plugs can be employed in order to contribute to cost reduction.

Furthermore, in the foregoing constructions, the internal combustion engine may include a direct-injection injector that injects fuel directly into the first cylinder, and a distal end of the direct-injection injector may be disposed at a position that is nearer to the turbo-side exhaust valve than to the bypass-side exhaust valve.

According to this construction, the distal end of the direct-injection injector in the first cylinder can be disposed in the vicinity of the turbo-side exhaust valve, in which temperature is relatively high. Due to this arrangement, fuel is injected to a high-temperature location near the turbo-side exhaust valve, so that the latent heat of vaporization of fuel will lower the ambient temperature of the turbo-side exhaust valve. Therefore, occurrence of abnormal combustion, such as a pre-ignition resulting from the existence of a high-temperature site, or the like, can be reliably prevented. Besides, since fuel is injected to a high-temperature location, the atomization of fuel can be promoted, so that good combustion can be carried out.

Furthermore, in the foregoing constructions, the internal combustion engine may have a second cylinder that is located adjacent to the first cylinder. Positions of the turbo-side exhaust valves and the bypass-side exhaust valves may be reverse between the adjacent cylinders, and an exhaust port communicating with the bypass-side exhaust valve of the first cylinder and an exhaust port communicating with the bypass-side exhaust valve of the second cylinder may join within a cylinder head.

According to this construction, the length and surface area of the channel of the exhaust gas discharged via the bypass-side exhaust valve of each cylinder can be made small. Hence, at the time of engine startup or low engine load, the amount of heat removed from the exhaust gas flowing from a bypass-side exhaust passageway to an exhaust purification catalyst can be made as small as possible, so that exhaust gas of as high a temperature as possible can be caused to flow into the exhaust purification catalyst. Therefore, the quick warm-up and temperature maintenance of the exhaust purification catalyst and can be achieved, so that the emission performance can be further improved.

A second aspect of the invention is a control method for an internal combustion engine in which a cylinder is provided with a turbo-side exhaust valve that opens and closes an exhaust port that communicates with a turbo-side exhaust passageway that leads to a turbine inlet opening of a turbo-supercharger, a bypass-side exhaust valve that opens and closes an exhaust port that communicates with a bypass-side exhaust passageway that bypasses the turbine, a first intake valve disposed opposite to the turbo-side exhaust valve, and a second intake valve disposed opposite to the bypass-side exhaust valve. In this control method, at a time of startup of the internal combustion engine and/or a time of low load of the internal combustion engine, the turbo-side exhaust valve is stopped in a closed state while the bypass-side exhaust valve is allowed to be in operation, and also the first intake valve is stopped in the closed state while the second intake valve is allowed to be in operation.

Therefore, when the burned gas in the cylinder is replaced by fresh air, the in-cylinder gas flows from the second intake valve toward the bypass-side exhaust valve, so that a strong swirl rotating in that direction can be produced. As a result, the mixing in the cylinder is promoted, and the combustion can be bettered. Therefore, good combustion can be performed even in a severe combustion condition, such as low temperature, low engine speed, a lean-burn operation, an EGR operation, etc. Therefore, excellent effect of bettering fuel economy and excellent effect of preventing knocking can be attained.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Embodiment 1

Figure 1:
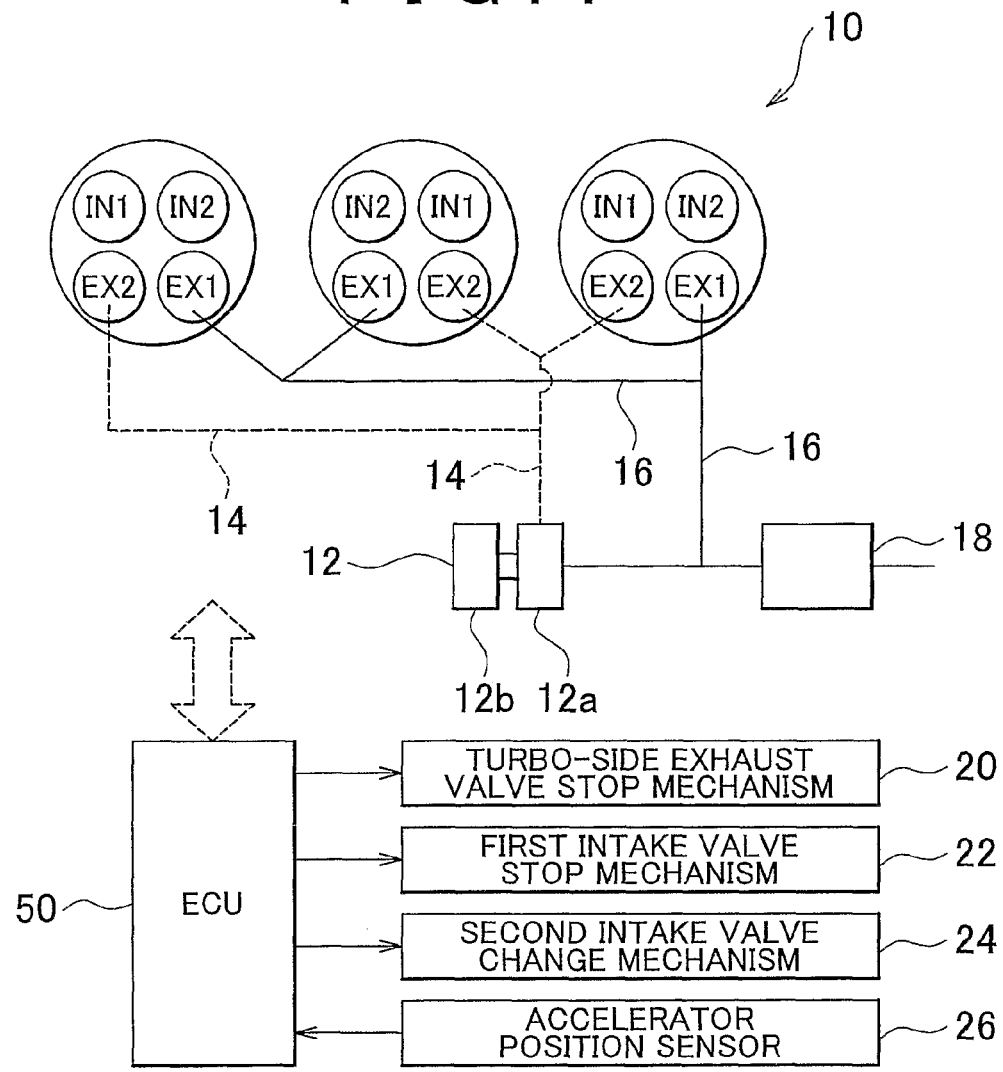
FIG. 1 is a diagram schematically showing a system construction of Embodiment 1 of the invention.

FIG. 1 is a diagram schematically showing a system construction of Embodiment 1 of the invention. As shown in FIG. 1, a system of this embodiment includes an internal combustion engine 10 that is mounted in a vehicle or the like. The internal combustion engine 10 is equipped with a turbo-supercharger 12 that has an exhaust turbine 12a and an intake compressor 12b. The internal combustion engine 10 of this embodiment is a V six-cylinder engine. FIG. 1 shows one of the banks of the V-6 engine (the three cylinders of one of the two sides). In addition, the internal combustion engine in the invention is not limited to this type, but may have any, number of cylinders in any cylinder arrangement.

Each of the cylinders of the internal combustion engine 10 is provided with two exhaust valves, that is, a turbo-side exhaust valve EX2 and a bypass-side exhaust valve EX1. In this embodiment, these valves of the cylinders are disposed so that the positions of the turbo-side exhaust valve EX2 and the bypass-side exhaust valve EX1 of adjacent cylinders are reverse from each other. Specifically, in FIG. 1, the positions of the turbo-side exhaust valve EX2 and the bypass-side exhaust valve EX1 of the center cylinder are reverse from those of the two flanking cylinders. In addition, in this invention, the foregoing construction is not restrictive, but the positions of the turbo-side exhaust valve EX2 and the bypass-side exhaust valve EX1 may be the same between adjacent cylinders.

An exhaust port that communicates with the turbo-side exhaust valve EX2 communicates with a turbo-side exhaust passageway 14 that leads to an inlet opening of the exhaust turbine 12a of the turbo-supercharger 12. On the other hand, an exhaust port that communicates the bypass-side exhaust valve EX1 communicates with a bypass-side exhaust passageway 16 that does not lead to an inlet opening of the exhaust turbine 12a, that is to say, the bypass-side exhaust passageway 16 that bypasses the exhaust turbine 12a.

The exhaust gas having passed through the exhaust turbine 12a and the exhaust gas having passed through the bypass-side exhaust passageway 16 join into a single current, which flows into an exhaust purification catalyst 18.

Each cylinder of the internal combustion engine 10 is provided with two intake valves, that is, a first intake valve IN1 and a second intake valve IN2. The first intake valve IN1 is disposed opposite to (adjacent to) the turbo-side exhaust valve EX2, and the second intake valve IN2 is disposed opposite to (adjacent to) the bypass-side exhaust valve EX1.

The internal combustion engine 10 is equipped with a turbo-side exhaust valve stop mechanism 20 that stops only the turbo-side exhaust valve EX2 of each cylinder in a closed state while allowing the bypass-side exhaust valve EX1 to be in operation. Besides, the internal combustion engine 10 is also equipped with a first intake valve stop mechanism 22 that stops only the first intake valve IN1 of each cylinder in a closed state while allowing the second intake valve IN2 to be in operation, and a second intake valve change mechanism 24 that changes the open valve duration (operation angle) of the second intake valve IN2 of each cylinder. The structures of these mechanisms are known to public, and descriptions thereof are omitted in this specification.

The internal combustion engine 10 as described above may be a lean-burn engine operating at an air-fuel ratio that is leaner than the stoichiometric air-fuel ratio. Besides, the internal combustion engine 10 may also be equipped with an EGR device that executes an EGR (Exhaust Gas Recirculation) operation in which a portion of exhaust gas is refluxed into the intake passageway.

The system of this embodiment is equipped with an ECU (Electronic Control Unit) 50. Various devices and the like are electrically connected to the ECU 50, including the turbo-side exhaust valve stop mechanism 20, the first intake valve stop mechanism 22 and the second intake valve change mechanism 24 as well as the actuators of a fuel injection device, an ignition device, a throttle valve, etc. (which are not shown in the drawings), and also various sensors, such as an accelerator position sensor 26, a crank angle sensor, an air flow meter, etc. The accelerator position sensor 26 detects the position of an accelerator pedal. In accordance with the value detected by the accelerator position sensor 26, the engine load can be calculated.

Figure 2:
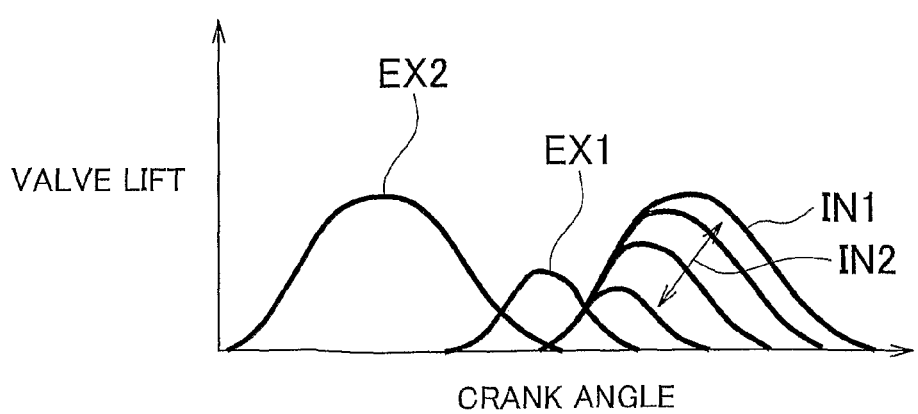
FIG. 2 is a valve lift graph of intake valves and exhaust valves of an internal combustion engine in Embodiment 1 of the invention.

FIG. 2 is a valve lift graph of the intake valves and the exhaust valves of each cylinder of the internal combustion engine 10. As shown in FIG. 2, the opening timing of the bypass-side exhaust valve EX1 is later than the opening timing of the turbo-side exhaust valve EX2, and the closing timing of the bypass-side exhaust valve EX1 is later than the closing timing of the turbo-side exhaust valve EX2. Specifically, the bypass-side exhaust valve EX1 opens in the latter half of the exhaust stroke, and closes after the intake valves open. Besides, the open valve duration of the bypass-side exhaust valve EX1 is shorter than the open valve duration of the turbo-side exhaust valve EX2.

In addition, as shown in FIG. 2, the open valve duration of the second intake valve IN2 is continuously changed by operation of the second intake valve change mechanism 24. The ECU 50 controls the second intake valve change mechanism 24 so that at the time of high-speed and high-load operation, the open valve duration of the second intake valve IN2 is made to be a maximum open valve duration that is substantially equal to that of the first intake valve IN1, and so that the open valve duration of the second intake valve IN2 shortens as the engine load lessens.

On the other hand, the turbo-side exhaust valve stop mechanism 20 and the first intake valve stop mechanism 22 are controlled as described below, according to the operation situation of the internal combustion engine 10.

(At Time of Startup, Low Load)

At the time of engine startup or low engine load, the ECU 50 stops the turbo-side exhaust valve EX2 of each cylinder in the closed state via the turbo-side exhaust valve stop mechanism 20, and stops the first intake valve IN1 in the closed state via the first intake valve stop mechanism 22. In this state, the burned gas in each cylinder is entirely discharged via the bypass-side exhaust valve EX1. Therefore, the entire amount of exhaust gas flows into the bypass-side exhaust passageway 16, and flows into the exhaust purification catalyst 18 without passing through the exhaust turbine 12a. Therefore, the decline in the gas temperature in the exhaust turbine 12a can be avoided, so that high-temperature exhaust gas can be caused to flow into the exhaust purification catalyst 18. Therefore, after the engine is started up, the exhaust purification catalyst 18 can be quickly warmed up. Besides, it is possible to keep the temperature of the exhaust purification catalyst 18 high when the engine load is low. Due to these features, the emission performance can be sufficiently improved.

Figure 3:
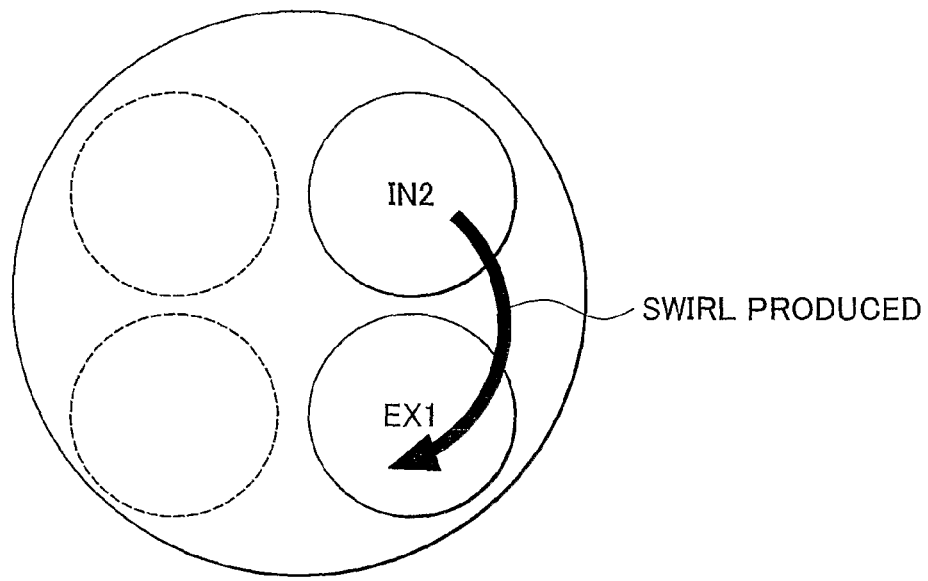
FIG. 3 is a diagram for describing gas flows in a cylinder at the time of engine startup or low engine load.

FIG. 3 is a diagram for describing gas flows in a cylinder at the time of startup of the engine or low engine load. As stated above, at the engine startup or low engine load, the turbo-side exhaust valve EX2 and the first intake valve IN1 are stopped, and only the bypass-side exhaust valve EX1 and the second intake valve IN2 are operated. Therefore, when the burned gas in the cylinder is replaced by fresh air, the burned gas is discharged via the bypass-side exhaust valve EX1, and the fresh air flows in via the second intake valve IN2. Hence, the in-cylinder gas flows in a direction of an arrow in FIG. 3. In consequence, strong swirl that rotates clockwise in FIG. 3 can be produced.

(At Time of Intermediate Load, High Load)

When the engine load rises to an intermediate load region or a high load region, the ECU 50 switches the first intake valve stop mechanism 22 and the turbo-side exhaust valve stop mechanism 20 to operate the turbo-side exhaust valve EX2 and the first intake valve IN1. During this state, the turbo-side exhaust valve EX2 opens prior to the bypass-side exhaust valve EX1. Therefore, the in-cylinder high-temperature burned gas is firstly supplied to the exhaust turbine 12a. Therefore, the turbo-supercharger 12 is operated, so that the supercharging can be performed. During the latter half of the exhaust stroke, the bypass-side exhaust valve EX1 opens. Because the bypass-side exhaust valve EX1 does not lead to the inlet opening of the exhaust turbine 12a, the back pressure in the bypass-side exhaust valve EX1 is low. Therefore, the in-cylinder burned gas can be efficiently discharged via the bypass-side exhaust valve EX1. In consequence, the in-cylinder residual gas amount can be made very small, and the amount of air can be correspondingly increased, so that high engine output can be achieved. Besides, because the residual gas amount is small, knocking can be restrained, and the ignition timing retardation can be avoided. Therefore, increased engine output and better fuel economy can be achieved.

Figure 4:
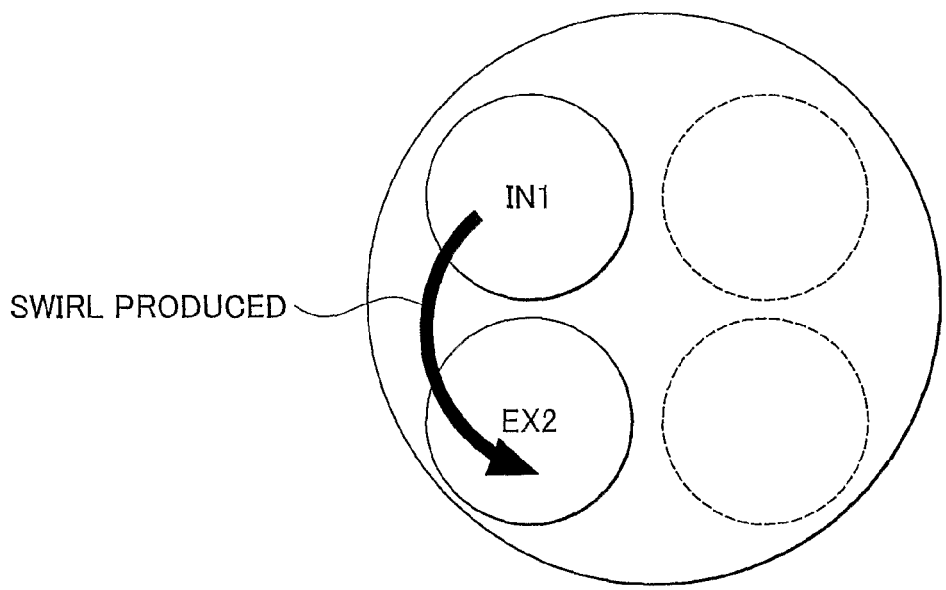
FIG. 4 is a diagram for describing gas flows in a cylinder at the time of intermediate engine load or high engine load.

FIG. 4 is a diagram for describing gas flows in a cylinder at the time of intermediate engine load or high engine load. At the time of intermediate engine load or high engine load, both the turbo-side exhaust valve EX2 and the bypass-side exhaust valve EX1 of each cylinder are opened. The open valve duration of the turbo-side exhaust valve EX2 is longer than that of the bypass-side exhaust valve EX1. Therefore, as for the flow of the burned gas discharged from the cylinder, the turbo-side exhaust valve EX2-side flow becomes the main flow. Besides, on the intake side, both the first intake valve IN1 and the second intake valve IN2 are opened. As described above, in the operation region other than the high-speed and high-load operation region, the open valve duration of the second intake valve IN2 is shorter than that of the first intake valve IN1. Therefore, as for the flow of fresh air into each cylinder, the first intake valve IN1-side flow becomes the main flow. Hence, when the in-cylinder burned gas is replaced by fresh air, the in-cylinder gas flows in the direction of an arrow in FIG. 4. Specifically, strong swirl rotating counterclockwise in FIG. 4 can be produced.

As described above, the internal combustion engine 10 can produce strong swirl in the cylinders in either one of the states shown in FIGS. 3 and 4, and therefore can promote the mixing in the cylinders. As a result, the combustion can be bettered, so that good combustion can be achieved even in a server combustion condition particularly at the time of low temperature, low load, the lean-burn operation, the EGR operation, etc. Therefore, excellent effect of bettering fuel economy and excellent effect of preventing knocking can be attained.

Figure 5:
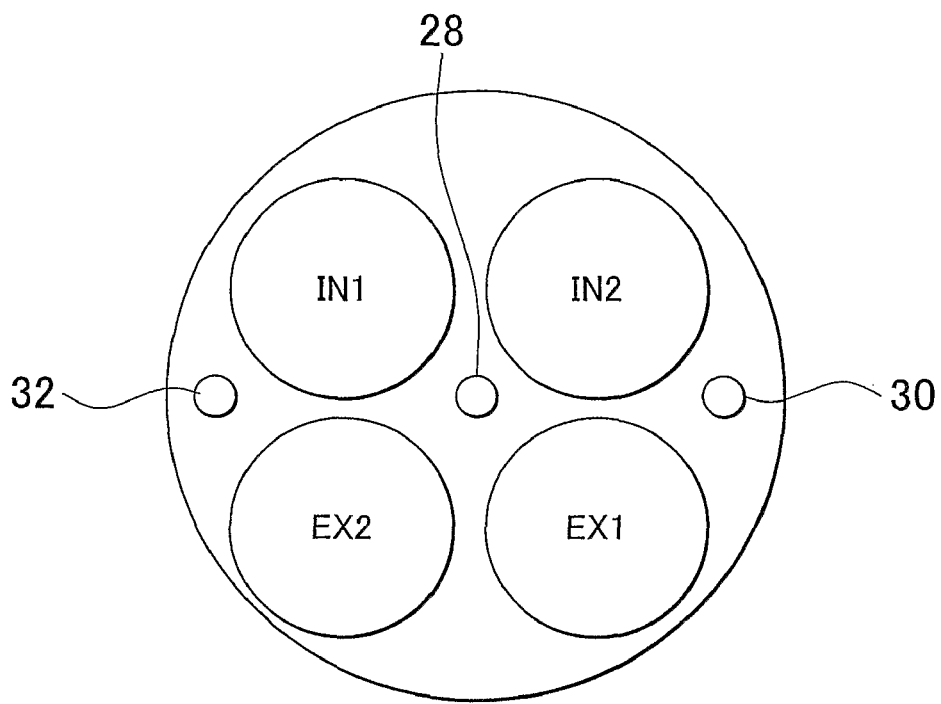
FIG. 5 is a schematic diagram for describing an arrangement of ignition plugs and a direct-injection injector.

The internal combustion engine 10 of this embodiment has two ignition plugs 28, 30 for each cylinder. This arrows ignition at two points. Therefore, stable combustion can be carried out, even in a condition where the ignition is not easy, for example, during the lean-burn operation, the EGR operation, etc. Besides, each cylinder of the internal combustion engine 10 of the embodiment has a direct-injection injector 32 that injects fuel directly into the cylinder. FIG. 5 is a schematic diagram for describing the arrangement of the ignition plugs 28, 30 and the direct-injection injector 32.

As shown in FIG. 5, of the two ignition plugs, the ignition plug 28 is disposed substantially at the center, and the other ignition plug 30 is disposed at a position that is remote from the turbo-side exhaust valve EX2 and near to the bypass-side exhaust valve EX1. Generally, the required voltage of the ignition plug becomes higher the higher the ambient temperature. In the internal combustion engine 10, the ambient temperature of the bypass-side exhaust valve EX1 is lower than the ambient temperature of the turbo-side exhaust valve EX2, as described below. Therefore, the required voltage of the ignition plug 30 can be made relatively low because the ignition plug 30 is disposed at the position that is near the low-temperature bypass-side exhaust valve EX1, not a position that is near the high-temperature turbo-side exhaust valve EX2.

In the intermediate-load operation region or the high-load operation region, the turbo-side exhaust valve EX2 opens earlier, and the bypass-side exhaust valve EX1 opens during the latter half of the exhaust gas stroke during which the in-cylinder temperature has sufficiently declined. Therefore, while the exhaust gas passing through the turbo-side exhaust valve EX2 has relatively high temperature, the exhaust gas passing through the bypass-side exhaust valve EX1 is relatively low in temperature, and small in amount. As a result, the temperature of the bypass-side exhaust valve EX1 is considerably lower than the temperature of the turbo-side exhaust valve EX2, so that the ambient temperature of the bypass-side exhaust valve EX1 also becomes considerably lower than the ambient temperature of the turbo-side exhaust valve EX2. Hence, the required voltage of the ignition plug 30 disposed in the vicinity of the bypass-side exhaust valve EX1 can be reduced. Therefore, the service life of the ignition plug 30 can be extended. Besides, instead of expensive ignition plugs that withstand high voltage, inexpensive low-voltage ignition plugs can be employed in order to contribute to cost reduction.

As for the direct-injection injector 32, a distal end (an injection hole) thereof is disposed at a position that is remote from the bypass-side exhaust valve EX1 and near to the turbo-side exhaust valve EX2. Due to this arrangement, fuel is injected to a high-temperature location near the turbo-side exhaust valve EX2, so that the latent heat of vaporization of fuel will lower the ambient temperature of the turbo-side exhaust valve EX2. Therefore, occurrence of abnormal combustion, such as a pre-ignition resulting from the existence of a high-temperature site, or the like, can be reliably prevented. Besides, because fuel is injected to a high-temperature location, the atomization of fuel can be promoted, so that good combustion can be carried out.

Figure 6:
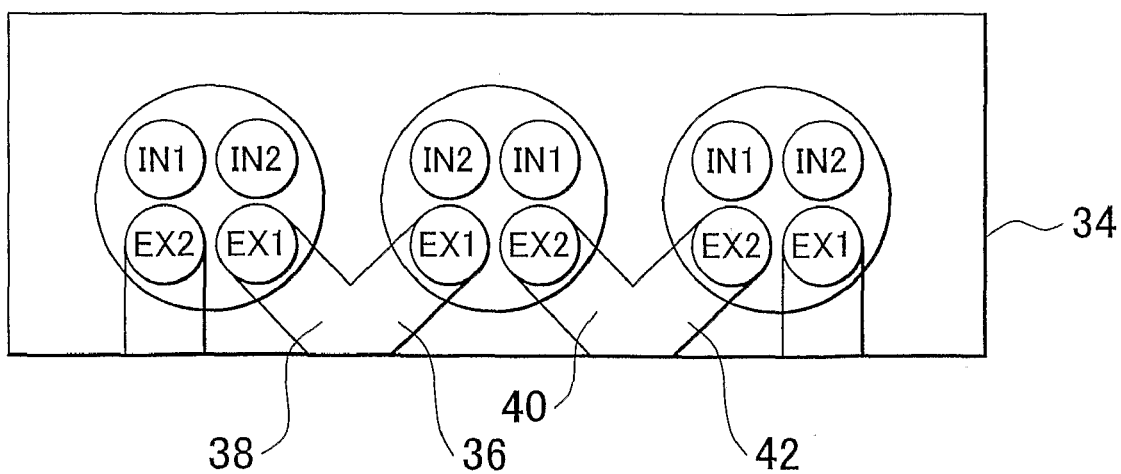
FIG. 6 is a diagram schematically showing a cylinder head of an internal combustion engine.

FIG. 6 is a diagram schematically showing a cylinder head 34 of the internal combustion engine 10. As described above, in the internal combustion engine 10 of the embodiment, the valves of the cylinders are arranged so that the positions of the turbo-side exhaust valve EX2 of the bypass-side exhaust valve EX1 of adjacent cylinders are reverse from each other. Therefore, the bypass-side exhaust valve EX1 of the center cylinder and the bypass-side exhaust valve EX1 of the left-side cylinder are positioned adjacent to each other. Besides, an exhaust port 36 communicating with the bypass-side exhaust valve EX1 of the center cylinder and an exhaust port 38 communicating with the bypass-side exhaust valve EX1 of the left-side cylinder are formed so as to join within the cylinder head 34. Due to this construction in the embodiment, the length and surface area of the channel of the exhaust gas discharged via the bypass-side exhaust valve EX1 of each cylinder can be lessened. Hence, at the time of engine startup or low engine load, the amount of heat removed from the exhaust gas flowing from the bypass-side exhaust passageway 14 to the exhaust purification catalyst 18 can be made as small as possible, so that exhaust gas of as high temperature as possible can be caused to flow into the exhaust purification catalyst 18. Therefore, the quick warm-up and temperature maintenance of the exhaust purification catalyst 18 and can be achieved, so that the emission performance can be further improved.

Furthermore, in this embodiment, the turbo-side exhaust valves EX2 of the center and right-side cylinders in FIG. 6 are positioned adjacent to each other. An exhaust port 40 communicating with the turbo-side exhaust valve EX2 of the center cylinder and an exhaust port 42 communicating with the turbo-side exhaust valve EX2 of the right-side cylinder are formed so as to join within the cylinder head 34. Hence, the length and surface area of the channel of the exhaust gas discharged via the turbo-side exhaust valve EX2 of each cylinder can be lessened, so that the temperature (energy) of the exhaust gas that flows into the exhaust turbine 12a can be heightened. Therefore, the rotation speed of the turbo-supercharger 12 can be promptly raised.

While the control device for an internal combustion engine of the invention has been described with reference to the embodiment shown in the drawings, the invention is not limited to the foregoing embodiment. For example, although in the above-described embodiment, the open valve duration of the bypass-side exhaust valve EX1 is fixed, the internal combustion engine 10 may also be provided with a variable valve mechanism that changes the open valve duration of the bypass-side exhaust valve EX1. Besides, a bypass control valve may also be provided in an intermediate portion of the bypass-side exhaust passageway 16.

In addition, in Embodiment 1 described above, the ECU 50 functions as a "stop mechanism control portion" in the invention by stopping the turbo-side exhaust valve EX2 in the closed state via the turbo-side exhaust valve stop mechanism 20 and stopping the first intake valve IN1 in the closed state via the first intake valve stop mechanism 22 at the time of engine startup or low engine load.

The invention claimed is:

1. An internal combustion engine control device comprising:
    an internal combustion engine in which a first cylinder includes a turbo-side exhaust valve that opens and closes an exhaust port that communicates with a turbo-side exhaust passageway that leads to a turbine inlet opening of a turbo-supercharger, a bypass-side exhaust valve that opens or closes an exhaust port that communicates with a bypass-side exhaust passageway that bypasses a turbine, a first intake valve disposed opposite to the turbo-side exhaust valve, and a second intake valve disposed opposite to the bypass-side exhaust valve;
    a turbo-side exhaust valve stop mechanism that stops the turbo-side exhaust valve in a closed state while allowing the bypass-side exhaust valve to be in operation;
    a first intake valve stop mechanism that stops the first intake valve in a closed state while allowing the second intake valve to be in operation; and
    a stop mechanism control portion that stops the turbo-side exhaust valve and the first intake valve in the closed state at a time of startup of the internal combustion engine and/or a time of low load of the internal combustion engine,
    wherein at a time of intermediate load of the internal combustion engine and/or a time of high load of the internal combustion engine, an open valve duration of the turbo-side exhaust valve is made longer than an open valve duration of the bypass-side exhaust valve, and an open valve duration of the first intake valve is made longer than an open valve duration of the second intake valve.

2. The internal combustion engine control device according to claim 1, wherein
    a rotation direction of a swirl formed in the first cylinder at the time of startup of the internal combustion engine and/or the time of low load of the internal combustion engine is opposite to the rotation direction of the swirl formed in the first cylinder at the time of intermediate load of the internal combustion engine and/or the time of high load of the internal combustion engine.

3. The internal combustion engine control device according to claim 1, wherein
    at the time of intermediate load of the internal combustion engine and/or the time of high load of the internal combustion engine, the bypass-side exhaust valve is opened later than the turbo-side exhaust valve, and the bypass-side exhaust valve is closed later than the turbo-side exhaust valve.

4. The internal combustion engine control device according to claim 1, wherein
    the internal combustion engine has two ignition plugs for the first cylinder, and
    one ignition plug of the two ignition plugs is disposed near a center of the first cylinder, another ignition plug of the two ignition plugs is disposed at a position that is nearer to the bypass-side exhaust valve than to the turbo-side exhaust valve.

5. The internal combustion engine control device according to claim 1, wherein
    the internal combustion engine includes a direct-injection injector that injects fuel directly into the first cylinder, and a distal end of the direct-injection injector is disposed at a position that is nearer to the turbo-side exhaust valve than to the bypass-side exhaust valve.

6. The internal combustion engine control device according to claim 5, wherein
    the internal combustion engine has a third cylinder that is located adjacent to the second cylinder;
    positions of the turbo-side exhaust valves and the bypass-side exhaust valves of the second cylinder and the third cylinder are reverse between the second cylinder and the third cylinder, and an exhaust port communicating with the turbo-side exhaust valve of the second cylinder and an exhaust port communicating with the turbo-side exhaust valve of the third cylinder join within the cylinder head.

7. The internal combustion engine control device according to claim 1, wherein
    the internal combustion engine has a second cylinder that is located adjacent to the first cylinder;
    positions of the turbo-side exhaust valves and the bypass-side exhaust valves of the first cylinder and the second cylinder are reverse between the first cylinder and the second cylinder, and an exhaust port communicating with the bypass-side exhaust valve of the first cylinder and an exhaust port communicating with the bypass-side exhaust valve of the second cylinder join within a cylinder head.

8. The internal combustion engine control device according to claim 1, further comprising:
    a second intake valve change mechanism that changes the open valve duration of the second intake valve;
    wherein at the time of intermediate load of the internal combustion engine and/or the time of high load of the internal combustion engine, the open valve duration of the second intake valve is set shorter than the open valve duration of the first intake valve, and
    wherein the second intake valve change mechanism changes the open valve duration of the second intake valve to be longer as load of the internal combustion engine increases.

9. A control method for an internal combustion engine in which a cylinder includes a turbo-side exhaust valve that opens and closes an exhaust port that communicates with a turbo-side exhaust passageway that leads to a turbine inlet opening of a turbo-supercharger, a bypass-side exhaust valve that opens and closes an exhaust port that communicates with a bypass-side exhaust passageway that bypasses a turbine, a first intake valve disposed opposite to the turbo-side exhaust valve, and a second intake valve disposed opposite to the bypass-side exhaust valve, comprising:
    stopping the turbo-side exhaust valve in a closed state while allowing the bypass-side exhaust valve to be in operation, and also stopping the first intake valve in the closed state while allowing the second intake valve to be in operation, at a time of startup of the internal combustion engine and/or a time of low load of the internal combustion engine; and opening the turbo-side exhaust valve for a longer duration than the bypass-side exhaust valve and opening the first intake valve for a longer duration than the second intake valve, at a time of intermediate load of the internal combustion engine and/or a time of high load of the internal combustion engine.

10. The control method according to claim 8, wherein
a rotation direction of a swirl formed in the cylinder at the time of startup of the internal combustion engine and/or the time of low load of the internal combustion engine is opposite to the rotation direction of the swirl formed in the cylinder at the time of intermediate load of the internal combustion engine and/or the time of high load of the internal combustion engine.

11. The control method according to claim 8, further comprising:
opening the bypass-side exhaust valve later than the turbo-side exhaust valve, and closing the bypass-side exhaust valve later than the turbo-side exhaust valve.

* * * * *